(12) United States Patent
Lee et al.

(10) Patent No.: US 9,090,805 B2
(45) Date of Patent: *Jul. 28, 2015

(54) GRAPHENE OXIDE REDUCING AGENT COMPRISING A REDUCING AGENT CONTAINING A HALOGEN ELEMENT, METHOD FOR MANUFACTURING A REDUCED GRAPHENE OXIDE USING SAME, AND USE OF THE REDUCED GRAPHENE OXIDE MANUFACTURED BY THE METHOD

(75) Inventors: Hyo Young Lee, Suwon-si (KR); In Kyu Moon, Seoul (KR); Jung Hyun Lee, Gunpo-si (KR)

(73) Assignee: SUNGYUNKWAN UNIVERSITY FOUNDATION FOR CORPORATE COLLABORATION, Suwon-si (KR)

( * ) Notice: Subject to any disclaimer, the term of this patent is extended or adjusted under 35 U.S.C. 154(b) by 88 days.

This patent is subject to a terminal disclaimer.

(21) Appl. No.: 13/638,407

(22) PCT Filed: Sep. 1, 2010

(86) PCT No.: PCT/KR2010/005926
§ 371 (c)(1),
(2), (4) Date: Dec. 17, 2012

(87) PCT Pub. No.: WO2011/122743
PCT Pub. Date: Oct. 6, 2011

(65) Prior Publication Data
US 2013/0079552 A1    Mar. 28, 2013

(30) Foreign Application Priority Data

Mar. 29, 2010 (KR) ........................ 10-2010-0028122

(51) Int. Cl.
*C09K 3/00* (2006.01)
*B01D 69/08* (2006.01)
*B01D 71/02* (2006.01)
*B82Y 30/00* (2011.01)
*B82Y 40/00* (2011.01)
*C01B 31/04* (2006.01)
*H01G 9/042* (2006.01)
*H01M 4/48* (2010.01)

(52) U.S. Cl.
CPC . *C09K 3/00* (2013.01); *B01D 69/08* (2013.01); *B01D 71/021* (2013.01); *B82Y 30/00* (2013.01); *B82Y 40/00* (2013.01); *C01B 31/043* (2013.01); *C01B 31/0476* (2013.01); *H01G 9/042* (2013.01); *H01M 4/48* (2013.01); *Y10S 977/847* (2013.01)

(58) Field of Classification Search
None
See application file for complete search history.

(56) References Cited

U.S. PATENT DOCUMENTS 8,519,045 B2 *  8/2013  Jang et al. .................... 524/496

(Continued)

FOREIGN PATENT DOCUMENTS

KR    10-2009-0019870 A    2/2009
KR    10-2009-0059871 A    6/2009

OTHER PUBLICATIONS

Database CAPLUS Chemical Abstracts Service, Columbus, Ohio, US; Database Accession No. 2010:128628, Abstract of CN 101634032, Xia et al., Jan. 27, 2010.*

(Continued)

*Primary Examiner* — Karl J Puttlitz
(74) *Attorney, Agent, or Firm* — NSIP Law

(57) ABSTRACT

The present invention relates to a novel graphene oxide reducing agent and a method for manufacturing a reduced graphene oxide from graphene oxide using same. More particularly, in the present invention, the reduced graphene oxide is manufactured by reducing a graphene oxide using a reducing agent containing a halogen element, and is applicable as an electric conductor, a semiconductor, and an insulator in various fields.

10 Claims, 6 Drawing Sheets

(56) References Cited

U.S. PATENT DOCUMENTS

| | | |
|---|---|---|
| 2009/0235721 A1 | 9/2009 | Robinson et al. |
| 2011/0186789 A1* | 8/2011 | Samulski et al. ............. 252/514 |
| 2013/0156678 A1* | 6/2013 | Banerjee et al. .......... 423/445 R |

OTHER PUBLICATIONS

International Search Report (Form PCT/ISA/210) issued Jun. 29, 2011, in counterpart International Application No. PCT/KR2010/005926 (4pp including English translation).

* cited by examiner

GRAPHENE OXIDE REDUCING AGENT COMPRISING A REDUCING AGENT CONTAINING A HALOGEN ELEMENT, METHOD FOR MANUFACTURING A REDUCED GRAPHENE OXIDE USING SAME, AND USE OF THE REDUCED GRAPHENE OXIDE MANUFACTURED BY THE METHOD

CROSS REFERENCE TO RELATED APPLICATIONS

This application is a National Stage of International Application No. PCT/KR2010/005926, filed Sep. 1, 2010, claiming priority based on Korean Patent Application No. 10-2010-0028122, filed Mar. 29, 2010, the contents of all of which are incorporated herein by reference in their entirety.

TECHNICAL FIELD

The present disclosure relates to a graphene oxide reducer containing a reducer including a halogen element, and a method for producing reduced graphene oxide by using the reducer.

BACKGROUND ART

Since graphene has a hexagonal structure, in which carbons are connected to one another by conjugate bond, it has high conductivity and charge mobility. Thus, graphene is a material having high future applicability. Researchers are actively conducting researches to apply graphene existing in the nature. In order to use graphene in accordance with its use purpose, it is necessary to produce graphene consisting of a single layer or multiple layers, and not a lump of graphene.

Currently, in order to produce graphene consisting of a single layer or multiple layers, a method that produces a reduced graphene oxide compound is being used. According to the method, graphene oxide is first produced by using a sticky tape method or oxidizing a lump of graphene. Thereafter, the produced graphene oxide is dispersed in a solvent, applied to a device in accordance with its use purpose, and reduced once again to have the graphene characteristics.

As a method for producing a reduced graphene oxide compound by reducing graphene oxide, there are various known methods that use reducers such as hydrazine hydrate, sodium borohydrate ($NaBH_4$), and sulfuric acid ($H_2SO_4$). However, the conventional methods for producing reduced graphene oxide have problems with respect to restriction to use of a reducer, low efficiency, and impurities included, etc. Thus, a new producing method has been demanded.

Until the present, reduced graphene oxide obtained by using a hydrazine hydrate reducer has been known as having the highest purity. The reduced graphene oxide has 8-12 of a carbon/oxygen element ratio and contains nitrogen. The nitrogen element operates as an impurity. It is difficult to remove the nitrogen element. Due to the existence of the nitrogen element operating as an impurity, it is difficult to explain an electron transport phenomenon. Thus, it is necessary to remove the nitrogen element.

The inventors of the present disclosure had researched a method for producing reduced graphene oxide by using a new reducer. During the research, they recognized that in case of using a reducer including a halogen element, a content of impurities such as nitrogen is low. Accordingly, they recognized that in such a case, electrical conductivity is excellent, low processing can be performed, and thus, mass production can be achieved. As a result, the inventors have completed the present disclosure.

DISCLOSURE OF THE INVENTION

Problems to be Solved by the Invention

The present disclosure provides a new reducer capable of providing high purity reduced graphene oxide, which can be produced in a large scale and has a low content of impurities.

The present disclosure also provides a method for producing a reduced graphene oxide powder, paper, or film having excellent electrical conductivity from graphene oxide by using a new reducer.

Means for Solving the Problems

In order to achieve the above-described objects, the present disclosure provides a graphene oxide reducer containing a reducer including a halogen element, and a method for producing reduced graphene oxide by reacting graphene oxide with a reducer including a halogen element.

The terms "graphene oxide reducer" used in this document are defined to indicate a sole material used to reduce graphene oxide, or a combination thereof. For example, the material used to reduce graphene oxide may be a solvent of a reducer as well as a reducer.

Hereinafter, the present disclosure will be described in more detail.

The present disclosure provides a graphene oxide reducer containing a reducer including a halogen element. The reducer including a halogen element may be selected from a group consisting of HI, HCl, and HBr. In particular, the reducer including a halogen element is preferably HI.

The graphene oxide reducer of the present disclosure may further contain acid, which is weaker than the reducer including a halogen element, in addition to the reducer including a halogen element. For example, the graphene oxide reducer may further contain acetic acid, a carbonic acid, formic acid, or benzoic acid. In particular, acetic acid is preferable. If the graphene oxide reducer further contains acetic acid, the quality of reduced graphene oxide is remarkably improved.

The present disclosure also provides a method for producing reduced graphene oxide by reacting graphene oxide with the reducer including a halogen element. FIG. 1 illustrates a process for formation of reduced graphene oxide, in which an epoxide group and an alcohol group are removed from graphene oxide. (a) of FIG. 1 illustrates structure of graphene oxide. (b) of FIG. 1 illustrates structure of reduced graphene oxide, in which an epoxide group and an alcohol group are removed from graphene oxide.

According to the present disclosure, the reaction between the graphene oxide and the reducer including a halogen element may be performed at a temperature of 10° C. or more. Preferably, the reaction may be performed at a temperature of 10° C. to 120° C. It is obvious to one of ordinary skill in the art of the present disclosure that the reduction reaction of the graphene oxide effectively occurs at a high temperature. Thus, an upper limit of the reaction temperature is not significant in the present disclosure. The technical significance of the present disclosure lies in a lower limit of the reaction temperature. The producing process of the present disclosure can be performed at a relatively low temperature of 10° C., in particular, a room temperature. Thus, the present disclosure is advantageous in mass producing reduced graphene oxide at a low temperature.

According to the present disclosure, the reducer including a halogen element may be selected from a group consisting of HI, HCl, and HBr. In particular, the reducer including a halogen element is preferably HI.

The graphene oxide used in the present disclosure may be in the form of powders, a paper, and a film. For example, if the graphene oxide reducer of the present disclosure is reacted with a graphene oxide paper, reduced graphene oxide in the form of a paper can be obtained. If the graphene oxide reducer of the present disclosure is reacted with a graphene oxide film, reduced graphene oxide in the form of a film can be obtained. Since a graphene oxide powder, paper, or film can be produced according to a known method, detailed descriptions in this regard are omitted.

According to the method for producing reduced graphene oxide of the present disclosure, graphene oxide can be reduced by using the sole reducer including a halogen element or the reducer including a halogen element and acid weaker than the reducer including a halogen element. Examples of the acid weaker than the reducer including a halogen element includes acetic acid, a carbonic acid, formic acid, or benzoic acid. In particular, acetic acid is preferable. The acid weaker than the reducer including a halogen element performs at least two roles in reducing the graphene oxide. Firstly, weak acid is added to strong acid HI so as to help HI be more effectively and easily dissociated into I⁻ ions. Secondly, if the weak acid is added, rather than using HI solely, it is possible to prevent over reduction reaction, which proceeds to saturated hydrocarbon ($sp^3$) and may occur in case of using HI solely. Accordingly, if the acid weaker than the reducer including a halogen element is further contained, a yield rate of reduced graphene oxide can be improved.

In accordance with an illustrative embodiment of the present disclosure, reduced graphene oxide can be obtained by putting graphene oxide into a solvent, and then, adding the reducer including a halogen element to thereby cause a reaction. After the addition of the reducer, stirring is performed at a reaction temperature of 10° C. or more for 24 to 72 hours so that the reduced graphene oxide can be mass produced as shown in FIG. 2. The solvent is known in the art of the present disclosure and can be properly selected by one of ordinary skill in the art. However, an organic solvent or distilled water is preferable. As the organic solvent, acid weaker than the reducer including a halogen element is used. Acetic acid, a carbonic acid, formic acid, or benzoic acid is preferable. In particular, acetic acid is preferable.

In accordance with another illustrative embodiment of the present disclosure, a reduced graphene oxide paper or film can be produced by impregnating a graphene oxide paper or film in a reducer solution including a halogen element. After the impregnation of the graphene oxide paper or film in the reducer solution including a halogen element, the solution is reacted at the above-defined reaction temperature, washed, and dried, so that a reduced graphene oxide paper or film can be obtained. Here, the reducer solution including a halogen element may contain acid weaker than the reducer including a halogen element, e.g., acetic acid, a carbonic acid, formic acid, or benzoic acid. In particular, the reducer solution including a halogen element may preferably contain acetic acid.

In accordance with another illustrative embodiment of the present disclosure, a reduced graphene oxide paper or film can be produced by reacting a graphene oxide paper or film with a steam gas of the reducer including a halogen element, wherein the steam gas is vaporized from a halogen solution including a halogen element. For example, a graphene oxide paper or film is positioned at an upper portion of a reactant, in which a halogen solution including a halogen element exists in a lower portion of the reactant. The reactant is sealed and positioned in an oil bath, in which a temperature is constantly maintained. Once the constant reaction temperature is maintained, the reducer including a halogen element is vaporized from a halogen solution including a halogen element and becomes in the form of a steam gas. The generated steam gas of the reducer including a halogen element is reacted with a graphene oxide paper or film so that a reducer graphene oxide paper or film can be produced. Here, the reducer solution including a halogen element may further contain acid weaker than the reducer including a halogen element, e.g., acetic acid, a carbonic acid, formic acid, or benzoic acid. In particular, the reducer solution including a halogen element may preferably further contain acetic acid.

Electrical conductivity of the reduced graphene oxide powder produced according to the present disclosure is very excellent and ranges from 25,000 to 55,000 s/m.

The reduced graphene oxide produced according to the present disclosure can be used for a plastic solar cell doping material, a super capacitor, and a lithium battery electrode material. The reduced graphene oxide paper produced according to the present disclosure can be used for a membrane filter and gas storage.

The reduced graphene oxide film produced according to the present disclosure may be used as a biosensor, a transparent electrode material, a flexible electrode material, a memory device, a third non-linear optical device, and a counter electrode plate material.

Effect of the Invention

The present disclosure has an effect in providing high purity reduced graphene oxide having a low content of impurities by using a new graphene oxide reducer.

The new graphene oxide reducer according to the present disclosure is inexpensive and can produce a large quantity of reduced graphene oxide at a relatively low temperature of 10° C. or more.

In the reduced graphene oxide produced by the present disclosure, 15 or more of a percent ratio of carbon/oxygen elements are maintained. Thus, the reduced graphene oxide has an excellent electrical conductor characteristic. A degree of the reduction can be adjusted according to a reduction time. By adjusting the electrical characteristic of the reduced graphene oxide, the reduced graphene oxide may be applied to a conductor, and a semiconductor, etc.

Especially, the reduced graphene oxide produced by the present disclosure can be used for a plastic solar cell doping material, a super capacitor, and a lithium battery electrode material. The reduced graphene oxide paper can be used for a membrane filter and gas storage. The reduced graphene oxide film produced by the present disclosure may be applied to various fields such as a biosensor, a transparent electrode material, a flexible electrode material, a memory device, a third non-linear optical device, and a counter electrode plate material.

BEST MODE FOR CARRYING OUT THE INVENTION

Hereinafter, the configuration of the present disclosure will be described in more detail by reference to examples. However, the scope of the present disclosure is not limited to the examples.

Example 1-1

Figure 1:
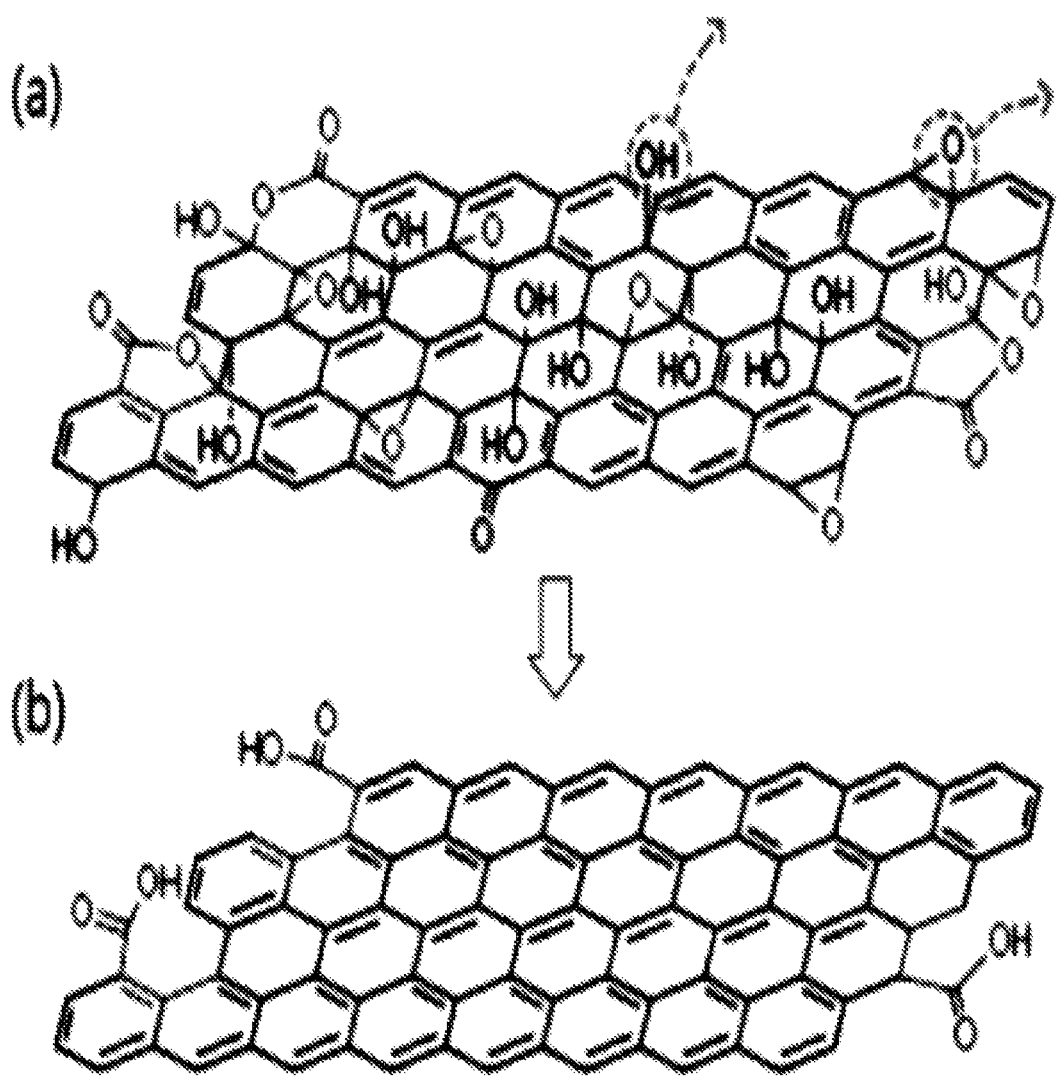
FIG. 1 illustrates a process for formation of reduced graphene oxide, in which an epoxide group and an alcohol group are representatively removed from graphene oxide.
Figure 2:
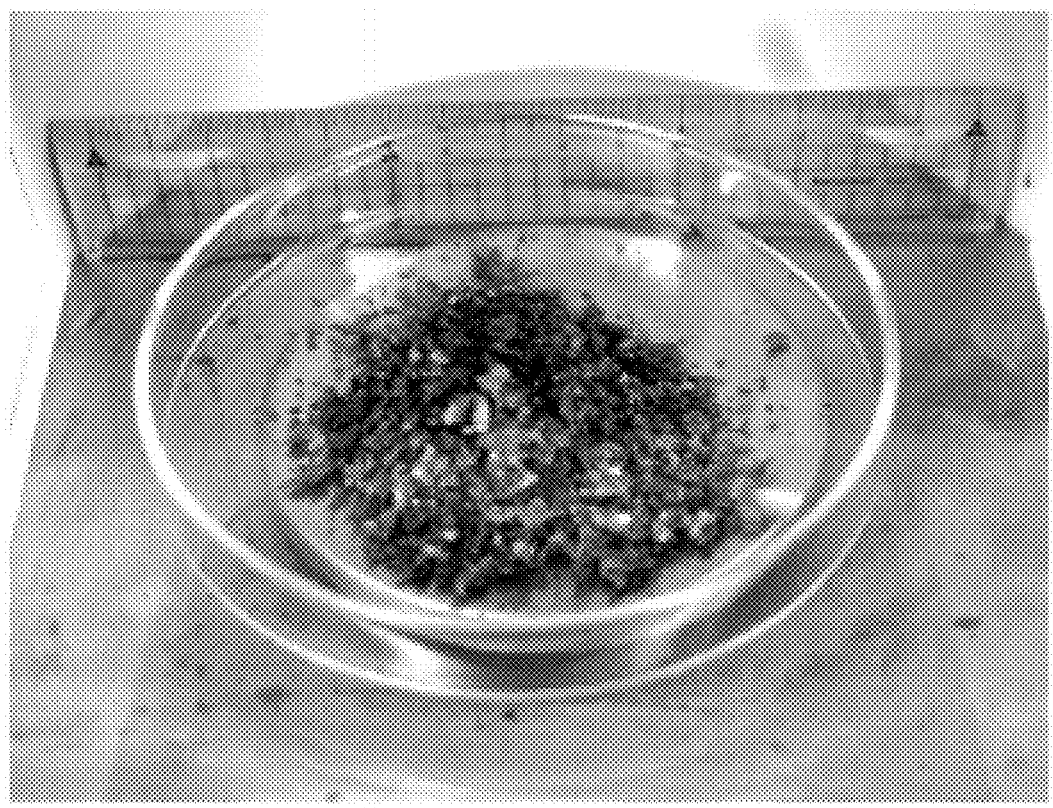
FIG. 2 is a photograph showing a reduced graphene oxide powder in a gray metallic color in accordance with Example 1.

Production of Reduced Graphene Oxide Through Hydroiodic Acid (HI) and Acetic Acid 4 g of graphene oxide was put into 4 l of acetic acid. Thereafter, in order to disperse the solution, the solution was put into an ultrasonic wave system and dispersed until the solution became clear. 0.8 l of hydroiodic acid (HI) was added thereto, and stirring was performed at 40° C. for 48 hours. Thereafter, the mixture was filtered by using a filter paper and washed with a sodium bicarbonate solution, water, and acetone. The filtered powders are reduced graphene oxide in a gray metallic color, which is identified from FIG. 2.

Example 1-2

Production of Reduced Graphene Oxide by Using Only Hydroiodic Acid (HI)

4 g of graphene oxide was put into 4 l of distilled water. Thereafter, in order to disperse the solution, the solution was put into an ultrasonic wave system and dispersed until the solution became clear. 0.8 l of hydroiodic acid (HI) was added thereto, and stirring was performed at 40° C. for 48 hours. Thereafter, the mixture was filtered by using a filter paper and washed with a sodium bicarbonate solution, water, and acetone. The filtered powders are reduced graphene oxide in a gray metallic color.

Comparative Example 1

Production of Reduced Graphene Oxide Through Hydrazine Hydrate

In order to produce reduced graphene oxide through hydrazine hydrate, a method that has been known up to the present as obtaining the highest purity reduced graphene oxide was used (Reference Document: D. Li, M. B. M, S. Filje, R. B. Kaner, G. G. Wallace, Processable aqueous dispersions of graphene nanosheets. Nature Nanotechnology, 3 (2008) 101-105)

First, a 0.05 wt % graphene oxide aqueous solution was prepared. 500 ml of distilled water, 1 ml of 35 wt % hydrazine hydrate, and 5 ml of 28 wt % ammonia water were added to 500 ml of the 0.05 wt % graphene oxide aqueous solution. The solution was stirred at 100° C. for 24 hours. The reaction solution was cooled at a room temperature. Thereafter, the mixture was filtered by using an anodisc membrane filter (diameter: 47 mm; pore size: 0.2 μm) and washed with distilled water 10 or more times so that reduced graphene oxide was obtained.

Experimental Example 1

Element Analysis of the Reduced Graphene Oxides Produced by Examples 1-1 and 1-2 and Comparative Example 1

In order to perform element analysis for the reduced graphene oxides produced by Examples 1-1 and 1-2 and Comparative Example 1, each of the samples was burned at a high temperature so that a burned product was obtained. Contents of carbons, hydrogen, nitrogen, sulfur, and oxygen in the burned product were analyzed. This method is widely used in deciding the purity of the reduced graphene oxide, in particular, a composition ratio of carbon and oxygen.

Graphene oxide and the reduced graphene oxides produced in Examples 1-1 and 1-2 and Comparative Example 1 were dried in a vacuum oven at 80° C. for 24 hours. Thereafter, about 10 mg of a sample was taken to perform element analysis. The results of the element analysis are provided in Table 1 below.

TABLE 1

| Samples | C | O | H | N | C/O | C/(N + O) |
|---|---|---|---|---|---|---|
| Graphene oxide | 44.56 | 46.43 | 2.13 | 0 | 1.28 | 1.13 |
| RGO produced by Example 1-1 | 82.63 | 7.21 | 0.64 | 0 | 15.27 | 15.27 |
| RGO produced by Example 1-2 | 83.48 | 10.20 | 0.72 | 0 | 10.88 | 10.88 |
| RGO produced by Comparative Example 1 | 85.32 | 11.42 | 0.11 | 3.15 | 9.96 | 7.57 |

According to the element analysis results in Table 1 above, a percent ratio of carbon/oxygen elements in the graphene oxide was 1.28. Percent ratios of carbon/oxygen elements in the reduced graphene oxides by Examples 1-1 and 1-2 were 15 or more and 10 or more, respectively. In case of the reduced graphene oxide by Comparative Example 1, the percent ratio was 10 or less.

No nitrogen element was found in the reduced graphene oxides produced by Examples 1-1 and 1-2. However, a nitrogen element was found in the reduced graphene oxide produced by Comparative Example 1.

From the above results, it was identified that the percent ratio of carbon/oxygen elements in the reduced graphene oxide produced by using the reducer including halogen is higher than that in the reduced graphene oxide obtained by using the hydrazine hydrate reducer. It was also identified that since a nitrogen element operating as an impurity is not contained, high purity reduced graphene oxide can be produced.

That is, high purity reduced graphene oxide, in which no nitrogen element exists, could have been produced by Examples 1-1 and 1-2 according to the present disclosure.

Example 2-1

Production of a Reduced Graphene Oxide Paper Through Hydroiodic Acid (HI) and Acetic Acid Graphene oxide was dispersed in distilled water. A certain amount of the dispersed graphene oxide solution was put on a plastic Petri plate such that the distilled water was slowly vaporized for about 2 days. As a result, a graphene oxide paper was obtained. The obtained graphene oxide paper was carefully detached from the plastic Petri plate.

The graphene oxide paper obtained through the vaporization was positioned in the inside of a 300 ml container of a 2 ml hydroiodic acid-5 ml acetic acid (HI-AcOH) solution, in which hydroiodic acid and acetic acid were mixed at a ratio of 2:5. The cover of the container was sealed with vacuum grease, and the container was put in an oil bath at a temperature of 40° C. for 24 hours. The graphene oxide paper was reacted with a hydroiodic acid (HI) steam gas so that a reduced graphene oxide paper was obtained.

Figure 3:
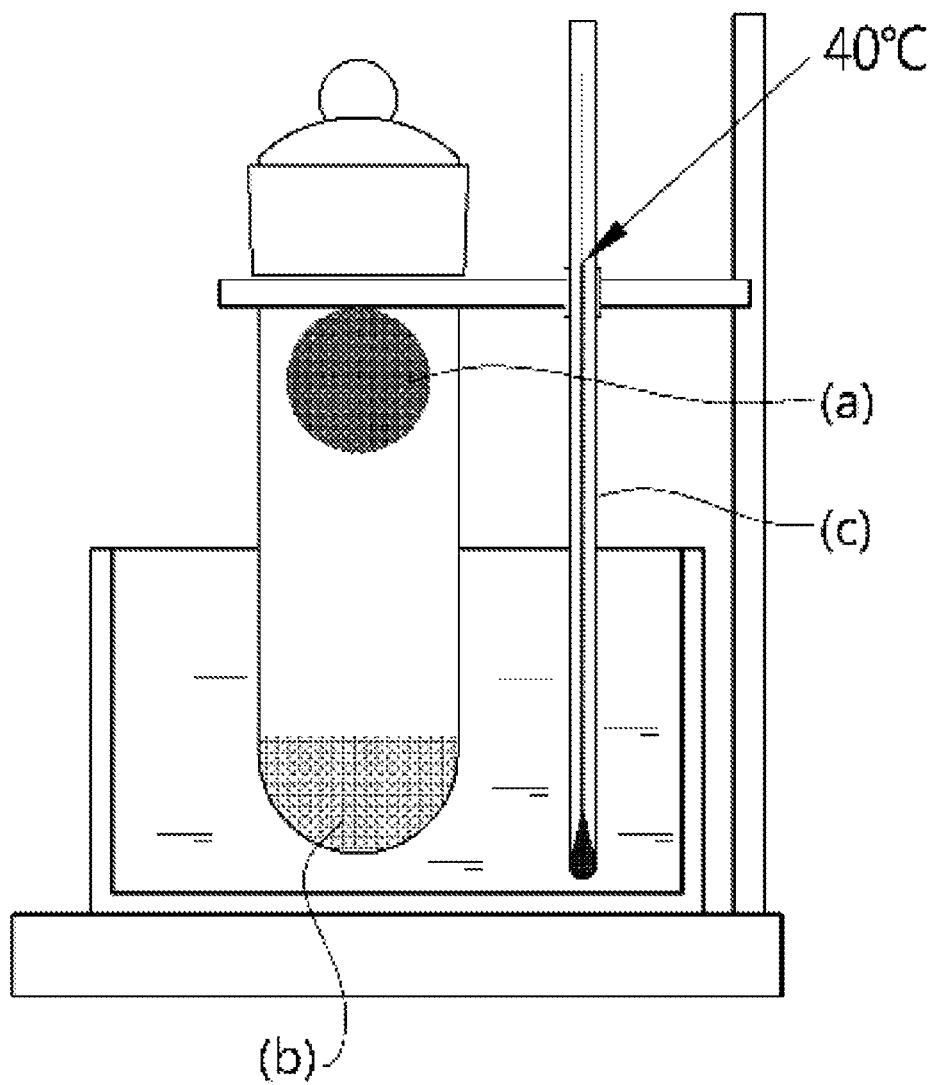
FIG. 3 is a schematic view of a steam reaction upon producing reduced graphene oxide by using a new reducer (hydroiodic acid-acetic acid, HI-AcOH)

(a) of FIG. 3 shows the graphene oxide film. (b) of FIG. 3 shows the hydroiodic acid-acetic acid (HI-AcOH) solution. (c) of FIG. 3 shows a thermometer. FIG. 3 is a schematic view of steam reaction upon producing reduced graphene oxide by using a new reducer. At this time, the reaction temperature was maintained at 40° C. The reaction was continued for 1 to 3 days depending on a thickness of graphene oxide. In general, as a thick of a graphene oxide is large, and a ratio of carbon/oxygen elements is intended to be raised, a reaction time should be increased.

Figure 4:
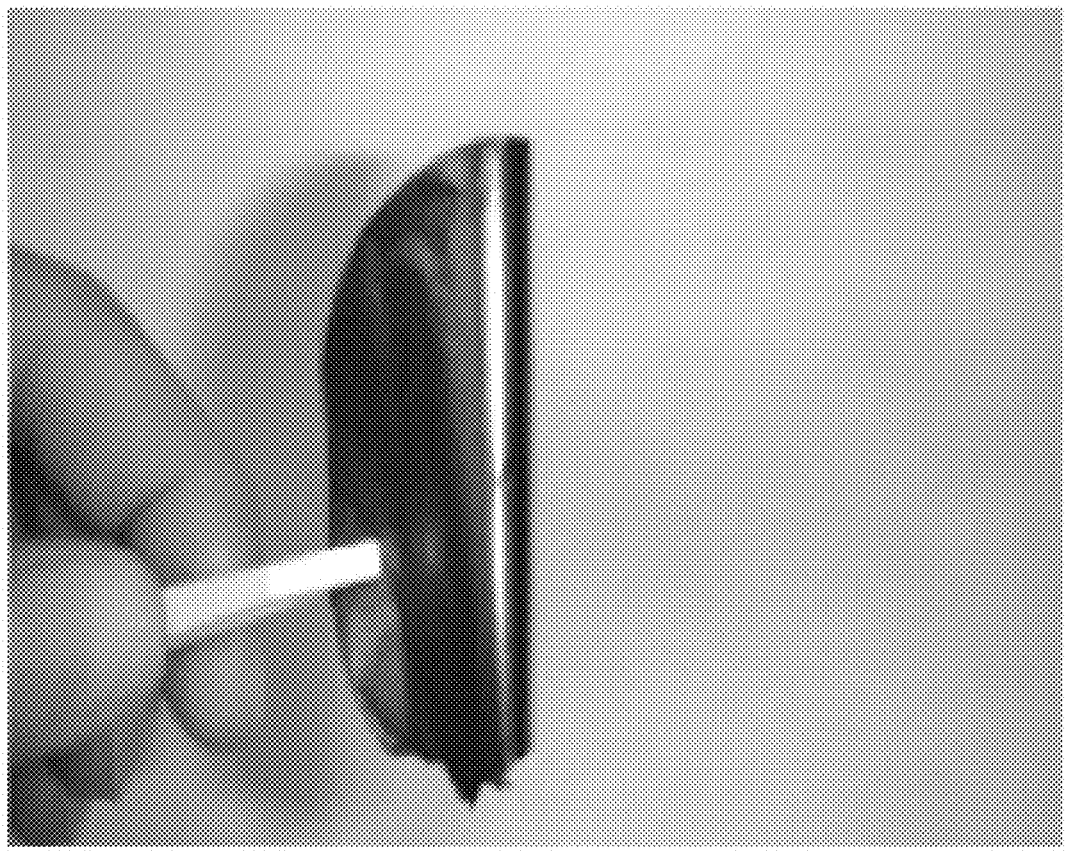
FIG. 4 is a photograph of a reduced graphene oxide paper (RGO paper), which can be bent and glitters in a gray color.

FIG. 4 is a picture showing a bending characteristic of the reduced graphene oxide paper. As the reaction is proceeded with, the color of the paper was changed from a brown color into a gray metallic color and glittered.

Examples 2-2 to 2-4

Production of a Reduced Graphene Oxide Paper Through Hydroiodic Acid (HI) and Acetic Acid Except that the reaction temperatures were maintained at 10° C. (Example 2-2), a room temperature (Example 2-3), and 30° C. (Example 2-4), the same conditions as those in Example 2-1 were adopted. A reduced graphene oxide paper similar to that in Example 2-1 was also obtained in Examples 2-2 to 2-4.

Comparative Example 2

Production of a Reduced Graphene Oxide Paper Through a Hydrazine Hydrate Solution Graphene oxide was dispersed in distilled water. A certain amount of the dispersed graphene oxide solution was put on a plastic Petri plate such that the distilled water was slowly vaporized for about 2 days. As a result, a graphene oxide paper was obtained. The obtained graphene oxide paper was carefully detached from the plastic Petri plate. The graphene oxide paper obtained through the vaporization was reacted with a hydrazine steam gas vaporized from the hydrazine hydrate solution at a temperature of 80° C. so that a reduced graphene oxide paper was produced.

Example 3-1

Production of a Reduced Graphene Oxide Film Through Hydroiodic Acid (HI) and Acetic Acid Graphene oxide was dispersed in distilled water. A certain amount of the dispersed graphene oxide solution was put on a plastic Petri plate such that the distilled water was slowly vaporized for about 2 days. The distilled water was further vaporized in a vacuum drier for about 1 day while maintaining a temperature of 50° C.

The graphene oxide solution was filtered by using a mixture-cellulose-ester membrane (pore size: 25 nm) filter paper. A thickness of the film depends on a concentration of the graphene oxide solution. The obtained film was dried at a room temperature while putting a load of more than about 1 kg. The film was put on a glass Petri plate such that the mixture-cellulose-ester membrane was carefully melted and removed dozens of times by using acetone and methanol.

The graphene oxide floating on the solution, into which acetone and methanol were injected, was moved on a polyethylene terephthalate (PET) substrate and dried at a room temperature. Thereafter, a graphene oxide film generated on the substrate was obtained.

Figure 5:
FIG. 5 is a photograph of a reduced graphene oxide film formed on a plastic substrate (polyethylene terephthalate (PET))

The graphene oxide film obtained through the vaporization was reacted with a hydroiodic acid (HI) steam gas from a hydroiodic acid-acetic acid (HI-AcOH) solution, in which hydroiodic acid and acetic acid were mixed at a ratio of 2:5, so that a reduced graphene oxide film was produced. FIG. 5 is a photograph of the reduced graphene oxide film obtained by using the polyethylene terephthalate (PET) substrate.

Examples 3-2 to 3-4

Production of a Reduced Graphene Oxide Film Through Hydroiodic Acid (HI) and Acetic Acid Except that the reaction temperatures were maintained at 10° C. (Example 3-2), a room temperature (Example 3-3), and 30° C. (Example 3-4), the same conditions as those in Example 3-1 were adopted. A reduced graphene oxide film similar to that in Example 3-1 was also obtained in Examples 3-2 to 3-4.

Experimental Example 2

Measurement of Electrical Conductivity

As a result of measuring electrical conductivity by using MCP-T600 (Mitsubishi Chemical) at a room temperature, electrical conductivity of the reduced graphene oxide produced by Example 1 was about 50,400 s/m. Electrical conductivity of the reduced graphene oxide produced by Comparative Example 1 was about 7,500 s/m. These results are verified from Table 2 below.

TABLE 2

| | Graphite | Reduced graphene oxide by Example 1-1 | Reduced graphene oxide by Comparative Example 1 |
|---|---|---|---|
| Electrical Conductivity | 80,700 | 50,400 | 7,500 |

The electrical conductivity of the reduced graphene oxide produced by Example 1-1 is higher about 6 times than the electrical conductivity of the reduced graphene oxide produced by Comparative Example 1. The reduced graphene oxide produced by Example 1-1 has the highest numerical value for the electrical conductivity in the world.

Table 3 below provides the results obtained from measuring electrical conductivity of the reduced graphene oxide papers produced by Example 2-1 and Comparative Example 2.

TABLE 3

|  | Reduced graphene oxide paper by Example 2-1 | Reduced graphene oxide paper by Comparative Example 2 |
|---|---|---|
| Resistance (Ω) | 4.34 | 74.9 |
| Sheet resistance (Ω) | 19.6 | 338 |
| Electrical conductivity (s/m) | 7,850 | 456 |

As a result of the measurement of the electrical conductivity, electrical conductivity of the reduced graphene oxide paper obtained in Example 2-1 was 7,850 s/m. Electrical conductivity of the reduced graphene oxide paper obtained in Comparative Example 2 was 456 s/m. It was verified that the electrical conductivity of the reduced graphene oxide paper obtained in Example 2-1 is higher about times than the electrical conductivity of the reduced graphene oxide paper obtained in Comparative Example 2.

Accordingly, it was confirmed that if a reduced graphene oxide paper is produced by using the new reducer according to the present disclosure, it is possible to obtain a reduced graphene oxide paper having electrical conductivity more excellent than that of a reduced graphene oxide paper produced by using a conventional reducer.

Experimental Example 3

X-Ray Diffraction Analysis

Figure 6:
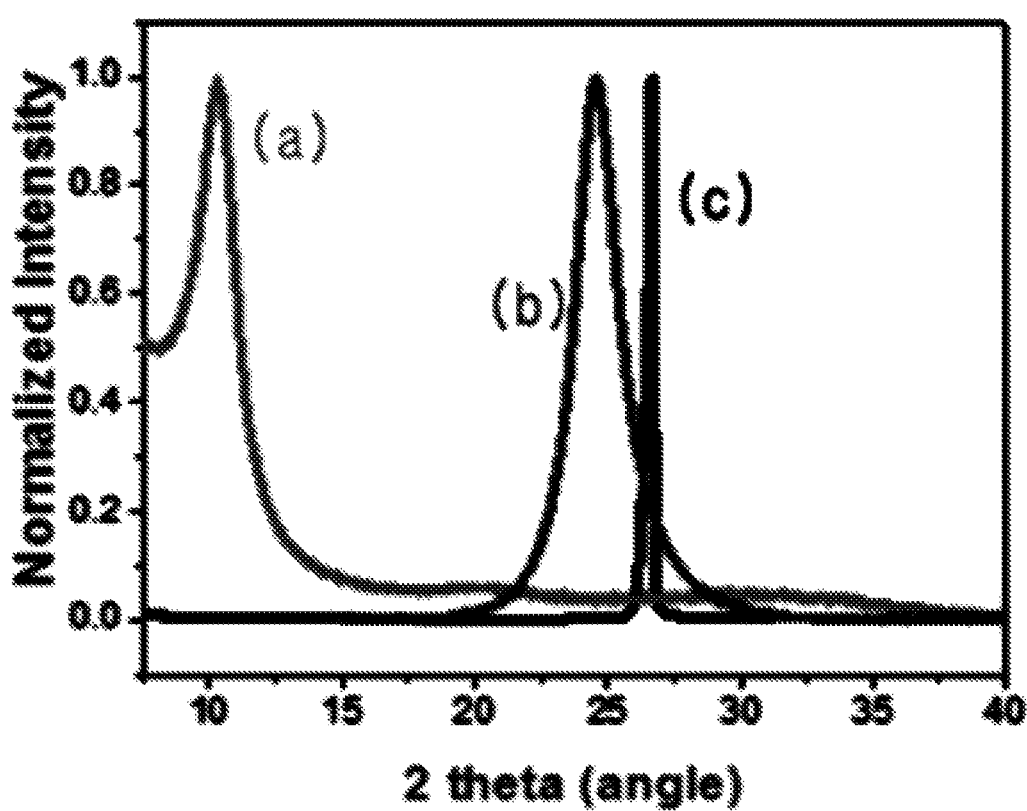
FIG. 6 is a graph showing X-ray diffraction analysis of reduced graphene oxide ((a): graphene oxide; (b): reduced graphene oxide produced by Example 1-1; and (c): graphite).

Through an X-ray diffraction analyzer (SIGMA PROBE, ThermoVG, U.K.), (a) measured graphene oxide, (b) measured the reduced graphene oxide produced by Example 1-1, and (c) measured crystal of graphite (Bay Carbon, SP-1 graphite). As result of the measurement, it was identified that electrical conductivity of the graphite of (c) was the most excellent. Since an interval of the reduced graphene oxides produced by Example 1-1 is 0.362 nm) (24.57°), the reduced graphene oxides are densely stacked. Thus, it was identified that the reduced graphene oxide produced by Example 1-1 exhibits higher electrical conductivity than that of the graphene oxide of (a). This result is verified from FIG. 6. Further, the result supports the high electrical conductivity value in Experimental Example 2.

What is claimed is:

1. A method for producing a reduced graphene oxide, the method comprising:
    reacting a graphene oxide with a reducer comprising: (a) an acid including a halogen element selected from the group consisting of HI, HBr, and HCl, and mixtures thereof; and (b) an acid that is weaker than the acid including a halogen element.
2. The method of claim 1, wherein the graphene oxide is in the form of a powder, a paper, or a film.
3. The method of claim 1, wherein the acid including a halogen element is HI.
4. The method of claim 1, wherein the acid that is weaker than the acid including a halogen element is selected from the group consisting of acetic acid, carbonic acid, formic acid, benzoic acid, and mixtures thereof.
5. The method of claim 1, wherein the acid that is weaker than the acid including a halogen element is acetic acid.
6. The method of claim 1, wherein the reducer is a steam gas.
7. The method of claim 6, wherein the graphene oxide is in the form of a powder, a paper, or a film.
8. The method of claim 6, wherein the acid including a halogen element is HI.
9. The method of claim 6, wherein the acid that is weaker than the acid including a halogen element is selected from the group consisting of acetic acid, carbonic acid, formic acid, benzoic acid, and mixtures thereof.
10. The method of claim 6, wherein the acid that is weaker than the acid including a halogen element is acetic acid.

* * * * *